June 5, 1951  H. W. HAPMAN  2,555,338
CONVEYER ELEMENT STRUCTURE
Filed Dec. 13, 1944  3 Sheets-Sheet 1
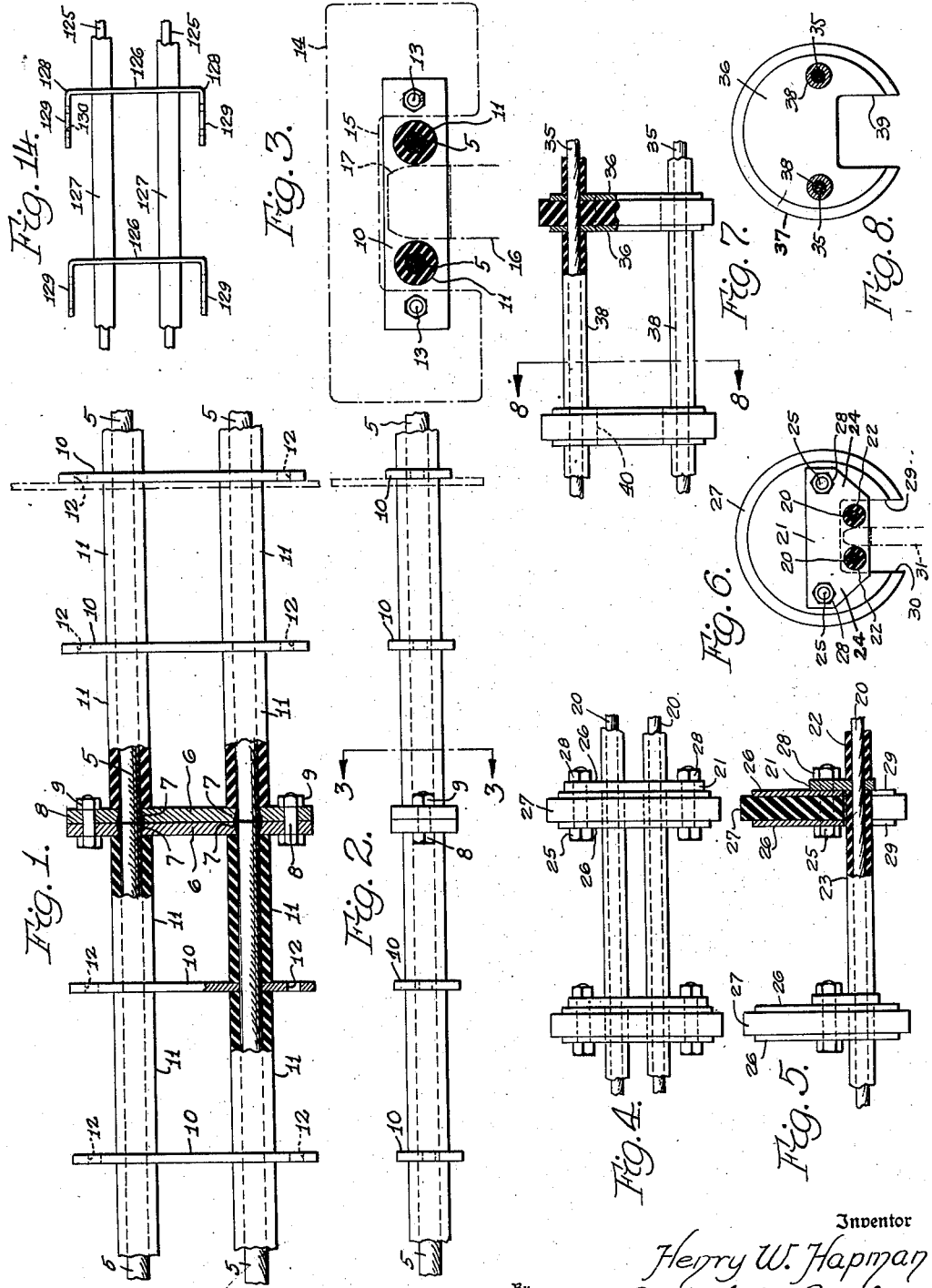
Inventor
Henry W. Hapman
Barthel & Bugbee
Attorneys June 5, 1951  H. W. HAPMAN  2,555,338
CONVEYER ELEMENT STRUCTURE
Filed Dec. 13, 1944  3 Sheets-Sheet 2
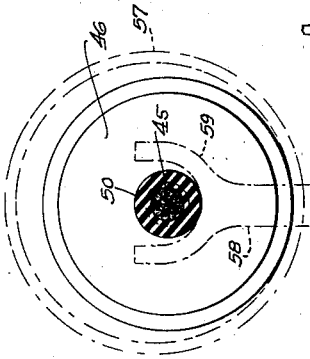
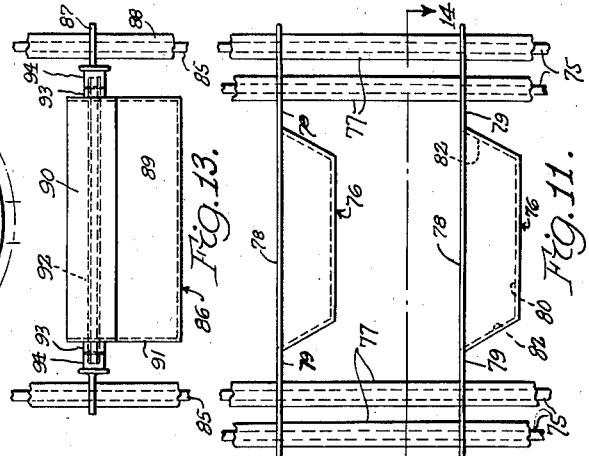
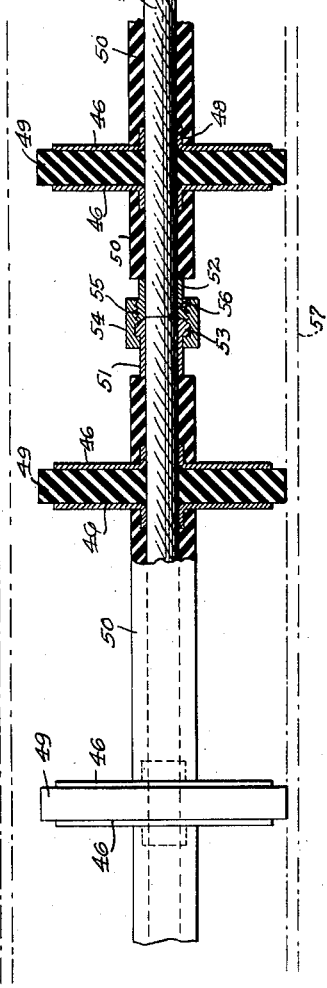
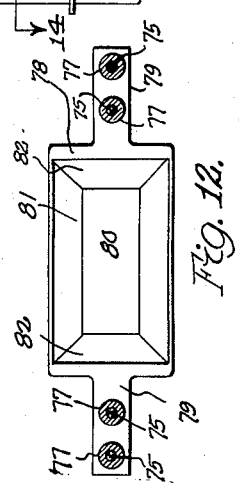
Inventor
Henry W. Hapman
Barthel & Bugbee
Attorneys June 5, 1951     H. W. HAPMAN     2,555,338
CONVEYER ELEMENT STRUCTURE
Filed Dec. 13, 1944     3 Sheets—Sheet 3
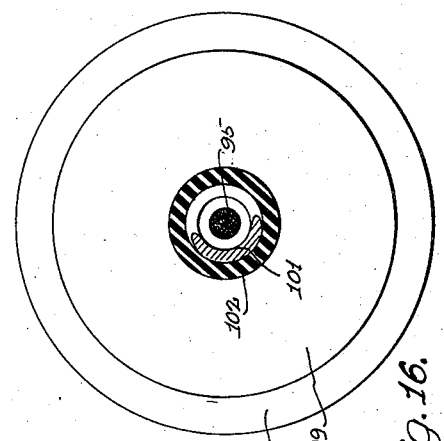
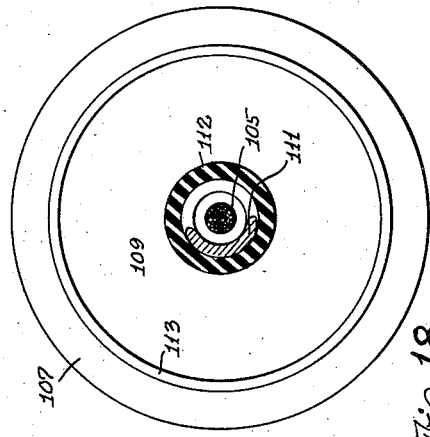
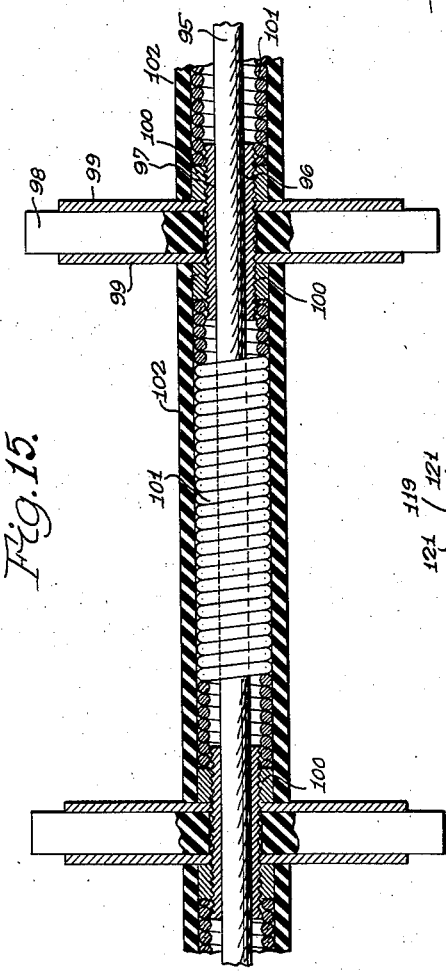
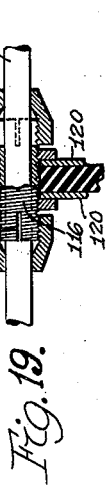
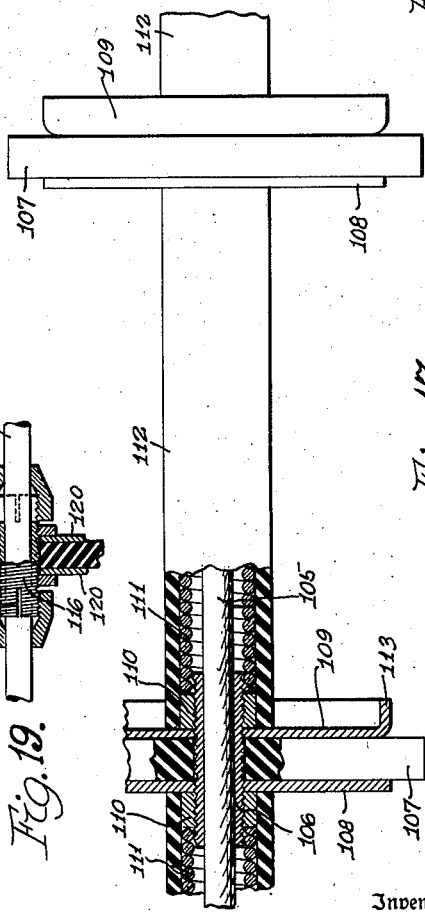
Inventor
Henry W. Hapman
By Barthel & Bugbee
Attorneys Patented June 5, 1951

2,555,338

UNITED STATES PATENT OFFICE 2,555,338

CONVEYER ELEMENT STRUCTURE

Henry W. Hapman, Detroit, Mich., assignor, by mesne assignments, of sixty per cent to Henry W. Hapman and forty per cent to Hannah Jane Hapman, both of Detroit, Mich.

Application December 13, 1944, Serial No. 567,961

7 Claims. (Cl. 198—176)

The present invention relates to improvements in conveyor structures and more particularly, to a flexible conveyor element and conveyor flights therefor.

The primary object of the invention is to provide a flexible endless drive member for conveyor elements and the like having side and cross members to adapt the endless drive member or conveyor element to conveyor structures having drive sprockets in much the same manner as a conventional endless chain type drive member or conveyor element and at the same time increasing the tensile strength, wearing qualities and efficiency of the endless drive member over said chain type drive member or conveyor element.

Another object of the invention is to provide a flexible conveyor element composed of a pair of flexible cable members having spaced apart conveyor flights thereon whereby said flights may be drivingly engaged by the teeth of a sprocket wheel while the flexible cable elements are disposed on opposite sides thereof.

Another object of the invention is to provide a novel connection for the ends of said flexible conveyor element to facilitate quick and easy assembly of the conveyor structure after the conveyor flight elements have been placed thereon.

Another object of the invention is to provide a conveyor structure of the above-mentioned type in which a resilient coil spring is positioned between the flight members in end-abutting relationship to space said flights about the endless drive member with the conveyor flights held in position by the compression of said coil springs, whereby said endless drive member may flex while traversing the conveyor sprockets but yet provide a substantially rigid drive between conveyor flights while the flights are travelling along straight conveyor courses.

Another object of the invention is to provide a conveyor structure including a flexible conveyor element composed of wire cables arranged in spaced apart relation with suitable flight supporting members extending therebetween and anchored thereto for receiving rubber flight members having backing plates on one or both sides thereof to facilitate the assembly of said conveyor structure and permit the removal of said flights for the purpose of repair and replacement.

Another object of the invention is to provide a conveyor structure of the above-mentioned type in which the flight supporting members are arranged to be engaged by the teeth of a drive sprocket or other conveyor propulsion device so as to render said flexible conveyor element applicable to all types of sprocket driven conveyor structures of both the open and closed conduit type.

Another object of the invention is to provide a conveyor flight for conveyor structures which is formed of natural or artificial rubber or rubber composition having a locking plate on one or both sides thereof with the rubber flight member projecting a slight distance beyond the edge thereof so as to lend sufficient rigidity to the flight member and yet prevent excessive wear on the conveyor conduit in which the conveyor structure is employed.

Another object of the invention is to provide a flight conveyor of the above-mentioned type in which the ends of the flexible cable members are affixed to coupling plates which are adapted to be secured together in face to face relationship by being bolted or otherwise secured together so as to provide an endless flexible conveyor element with the conveyor flights spaced from the clamping plates a distance equal to the distance between adjacent flight members.

Another object of the invention is to provide an endless drive member of the above-mentioned type having a pair of spaced flexible conveyor elements connected by transversely extending supporting members or the like which can be used for conveying finely divided abrasive material in chutes where excessive wear would prohibit the use of conveyor flight elements.

Other objects and advantages of the invention will become apparent during the course of the following description of the accompanying drawings, wherein:

Figure 1 is a top plan view of a preferred embodiment of the invention illustrating portions thereof broken away to show the manner in which the flexible cable members are connected together to form an endless flexible conveyor support for flight members;

Figure 2 is a side elevational view of a flexible conveyor element shown in Figure 1, further showing the manner in which the flight supporting elements carried by the flexible cable are separated and spaced apart one from the other;

Figure 3 is a vertical cross-sectional view taken on line 3—3 in Figure 2 looking in the direction of the arrows and showing the manner in which the endless flexible conveyor element is adapted to be driven by means of a drive sprocket;

Figure 4 is a top plan view of a slightly modified form of the invention showing the manner in which the flight members are disposed and connected to the transversely extending flight supports;

Figure 5 is a side elevational view similar to Figure 4 illustrating a portion thereof broken away to show the various structural details of the flexible conveyor element and the conveyor flights therefor;

Figure 6 is an end elevational view of the conveyor structure shown in Figures 4 and 5 showing the manner in which the flight supports are driven by a drive sprocket with the flight members cut away to permit reception of said drive sprockets when the flight members are traversing the radius thereof;

Figure 7 is a top plan view of another modified form of the invention in which the flight members are directly supported on the endless flexible cable as shown by the broken away portion of said flight and cable;

Figure 8 is a vertical cross-sectional view taken on line 8—8 of Figure 7 looking in the direction of the arrows and showing the manner in which the flight members are arranged relative to the endless flexible drive cables;

Figure 9 is a side elevational view of another modified form of the invention illustrating portions thereof broken away to show the manner in which the conveyor flights are affixed to the drive cable and the manner in which the same are spaced apart as well as showing the manner in which the cable ends are secured together;

Figure 10 is an end elevational view of the conveyor structure shown in Figure 9 showing the manner in which the angle drive cable is adapted to be driven by means of a drive member having forked drive ends for engaging the cable and flight members;

Figure 11 is a side plan view of another modified form of the invention showing the spaced flexible drive elements connected by bucket-type conveyor flights with the flights supported by a pair of flexible cables at each end thereof and spaced by flexible sleeves thereon;

Figure 12 is a vertical cross-sectional view taken on line 12—12 in Figure 11 looking in the direction of the arrows and showing the general contour of the bucket type conveyor flight;

Figure 13 is a side plan view of another modified form of the invention showing pivoted bucket-type flights connecting the spaced flexible endless conveyor elements in such a manner as to permit the conveyor buckets to assume a horizontal position during the various conveyor runs or courses;

Figure 14 is a top plan view of another modified form of the invention showing a slightly different flight supporting member for accommodating conveyor flights or buckets or various designs and shapes;

Figure 15 is a longitudinal cross-sectional view of a still further modified form of the invention showing the manner in which the flight members are spaced by coil springs and flexible sleeve members so that the flights may be driven through a compressional force as well as a tensional force;

Figure 16 is an end elevational view of the modified form of the invention shown in Figure 15 illustrating the manner in which the compressional drive chain is concentrically mounted with respect to the single drive cable and the resilient spacing sleeve;

Figure 17 is a side elevational view of a still further modified form of the invention showing a portion thereof broken away to illustrate the manner in which the conveyor conduits and tubing may be cleaned by means of a cupped cleaning disc arranged on one side of the conveyor flights;

Figure 18 is an end elevational view of the modified form of the invention shown in Figure 17 showing the general shape and contour of the cleaning cup and conveyor flight; and Figure 19 is a longitudinal cross-sectional view of another modified form of the invention showing another manner in which any one of the above indicated conveyor flight elements may be supported on a single or double flexible conveyor element and clamped thereto by means of a clamping sleeve surrounding the flexible cable and extending through an opening in one of the flight members.

In the drawings Figures 1 to 3 inclusive show a preferred embodiment of the invention having a pair of spaced wire cables 5, formed of either twisted strands or a single strand having sufficient resiliency to permit flexing and bending when the conveyor element is trained over suitable sprocket wheels or pulleys.

The ends of the cable 5 are adapted to be secured to coupling plates 6 which are provided with tapered openings 7 adjacent each end thereof for receiving the ends of said cables 5 so that they may be fixed in place by being brazed or welded in position by means of suitable brazing alloy disposed between the tapered bore 7 and the ends of said cable as shown in Figure 1. The coupling plates 6 are adapted to be secured together by clamping bolts and nuts 9 threaded on the ends thereof.

Before the coupling plates 6 are affixed in the manner above described, a series of conveyor flight supporting plates 10 and tubular rubber sleeve members are alternately arranged on the cables with the cables extending through apertures adjacent each end of the conveyor flight supporting plates 10 and the tubular rubber sleeve 11 extending therebetween and holding said flight supporting plates in spaced apart relation. The tubular rubber sleeves 11 may be formed of natural or synthetic rubber and may be adhesively secured to the cable 5 and flight supporting plates 10 by means of a rubber cement or cementitious composition similar to that shown and described in United States Patents Nos. 1,605,180, 1,617,588, 1,744,880. Similarly, the rubber spacing sleeves 11 adjacent the coupling plate 6 have their ends secured to said coupling plates by the above-mentioned cement so as to increase the tensile strength of the endless conveyor element and secure the flight supporting plates 10 one to the other as well as to the cables 5.

Formed in the extreme free ends of the flight supporting plates 10 are apertures 12 for receiving bolts 13 so that a series of conveyor flight members 14 may be secured to the flight supporting plates 10 as shown by the dotted lines in Figure 3. Likewise, a conveyor flight similar to the flight shown in Figure 3 may be sandwiched between the coupling plates 6 and held in place by the bolts 8. The conveyor flights 14 are cut away as at 15 to facilitate the reception of the teeth of a drive sprocket 16 (Figure 3) so that the teeth will engage the flight supporting plates 10 and thereby drive the flexible endless conveyor element in much the same manner as the conveyor chain with the tubular rubber sleeves 11 disposed on opposite sides of the sprocket 16 to prevent lateral displacement of the flexible endless conveyor element. It will thus be seen that a flexible endless conveyor element is provided having a series of spaced apart conveyor flights 14 which may be suitably shaped to conform to the conduit or channel pathway in which the conveyor element is disposed. Obviously, the conveyor flight 14 may be of any desired shape to conform to the cross-sectional shape of the conveyor conduit or passageway, and by employing a drive sprocket 16 with the teeth thereof as at 17 spaced a distance equal to the space between the conveyor flight supporting plates 10 so that the teeth drivingly engage the plates, the endless flexible conveyor element may be propelled through the conveyor conduit or other passageway so as to convey material therein.

In the modified form of the invention shown in Figures 4 to 6 inclusive, a pair of wire cable elements 20 is provided similar to the cable elements 5 and may have their ends connected in substantially the same fashion as pointed out in connection with the form of the invention shown in Figures 1 to 3 inclusive. In building up the endless flexible conveyor structure shown in Figures 4 to 6 inclusive, a series of conveyor flight supporting plates 21 are threaded on the cables 20 with the tubular rubber spacing sleeves 22 extending therebetween and alternately arranged on the cables 20. The tubular rubber sleeves 22 are adapted to be adhesively secured to the flexible cable 20 as well as having their ends adhesively secured to the conveyor flight supporting plates 21 in substantially the same manner as described in connection with the form of the invention shown in Figures 1 to 3 inclusive.

The conveyor flight supporting plates 21 are provided with wing portions 24 which extend laterally and project beyond the sides of the flexible cable 20 and spacing sleeves 22. Suitable apertures are formed in the wing portion 24 for receiving flight anchoring bolts 25 which are adapted to pass through disc-shaped conveyor flight plates 26 disposed on opposite sides of a natural or synthetic rubber conveyor flight 27 so that when the nut 28 is applied to the threaded end of the bolt 25, the conveyor flight plates 26 will be drawn into clamping engagement with the natural or synthetic rubber flight element 27 as well as being securely clamped and anchored to the flight supporting plate 21. The natural or synthetic rubber flight element 27 extends beyond the conveyor flight plates 26 so as to engage the walls of the conveyor conduit or conveyor channelway in which the conveyor element is used. The conveyor flight plates 26 are provided with radial slots 29 which are adapted to register with one another and with the radial slot 30 formed in the natural or synthetic rubber flight element 27. As shown in Figure 6, in dotted lines, a conveyor drive sprocket 31 is adapted to project into the radial slot formed by the cutaway portions 29 and 30 of the conveyor flight plates 26 and conveyor flights 27 so that the teeth of said sprocket will drivingly engage with the conveyor flight supporting plates 21 in the same manner as described in connection with the form of the invention shown in Figures 1 to 3 inclusive. Likewise, the conveyor cables 20 and spacing sleeves 22 are disposed on opposite sides of the conveyor sprocket to prevent lateral displacement and provide a flexible conveyor element similar to a conveyor chain structure.

In the modified form of the invention shown in Figures 7 and 8, a pair of flexible wire cable elements 35 are employed and before the ends of said cables are connected by means of coupling members, a series of conveyor plates 36 and natural or synthetic rubber flight members 37 are threaded thereon with tubular rubber spacing elements 38 alternately disposed between the conveyor flight clamping plates 36. It is intended that the conveyor flight plates 36 be adhesively secured to the natural or synthetic rubber flight element 37 and that the tubular rubber spacing sleeve 38 likewise be adhesively secured to the cables 35 and to the conveyor flight clamping plates 36 by an adhesive such as that described above in connection with the form of the invention shown in Figures 1 to 3 inclusive. The conveyor flight plates 36 are provided with radial slots 39 which are adapted to register with one another and with similar radial slots 40 formed in the natural or synthetic rubber flight elements 37 so as to permit the conveyor elements to be driven by means of a sprocket wheel with the teeth thereof drivingly engaging the conveyor flight clamping plates 36.

After the clamping plates 36, conveyor flights 37 and tubular spacing sleeves 38 are assembled on the flexible wire cable 35 and all of the parts adhesively secured or united together by a suitable adhesive such as the adhesive referred to above, the ends of the cable 35 are connected together to form an endless conveyor element which may be trained over suitable sprocket wheels disposed in the conveyor conduit or passageway in substantially the same manner as described in connection with the form shown in Figures 1 to 3.

In the modified form of the invention shown in Figures 9 and 10, a single flexible wire cable 45 is provided and is adapted to have assembled thereon a series of conveyor flight clamping plates 46 having centrally disposed annular flanges 48 surrounding suitable apertures in said conveyor flight plates 46 so as to be frictionally retained on the flexible wire cable 45. Also disposed on the flexible wire cable 45 is a series of natural or synthetic rubber flight elements 49 which are sandwiched between the conveyor flight plates 46 so that the peripheral portion thereof projects a slight distance beyond the peripheral edge of the conveyor flight plate 46. Tubular rubber spacing sleeves 50 are assembled on the wire cable 45 and disposed between adjacent conveyor flight plates 46, as shown in Figure 9, so that the ends of said tubular rubber sleeves or spacing elements 50 will overlie the annular flanges 48 of the conveyor flight plates 46 so that the tubular rubber sleeves may be adhesively secured to the flanges 48 and conveyor flight plates 46 by a rubber cement composition such as above described. As is the case in the forms of the invention shown in Figures 1 to 8 inclusive, the rubber spacing sleeves 50 are adhesively secured to the flexible wire cable 45 as well as the natural or synthetic rubber flight elements 49.

When the flight elements and tubular spacing sleeves 50 have thus been assembled on the wire cable 45, the ends thereof may be provided with tubular coupling members 51 and 52 so that the ends of said wire cables 45 may be welded or otherwise secured in place therein as shown clearly in Figure 9. An annular flange 53 is formed on the tubular coupling member 51 for retaining a coupling sleeve 54 thereon having internal screw threads 55 for receiving external screw-threads 56 formed on the enlarged head portion of the tubular coupling member 52. By simply threading the coupling sleeve 54 on the threads 56 of the tubular coupling sleeve 52, the ends of the cable 45 may be securely fastened together so that the endless flexible conveyor element may be mounted in a conveyor conduit or passageway as at 57 and propelled therein by means of a suitable drive sprocket 58. As shown in Figure 10, the drive sprocket 58 is provided with a series of circumferentially spaced forked portions 59 for receiving the wire cable 45 and tubular spacing sleeves 50 so that the forked portion 59 may drivingly engage one of the conveyor flight plates 46.

In the modified form of the invention shown in Figures 11 and 12, a pair of spaced wire cables (either solid or formed of a series of twisted strands) 75 are provided on each side of the pathway and said cables are adapted to have their ends fastened by means of the coupler shown in the various forms of the invention as in Figs. 1, 2, 3 and 9 so as to form an endless flexible conveyor element. Before the ends are coupled together, a series of conveyor buckets generally indicated by the reference character 76 are applied to the cables and arranged alternately with tubular rubber spacing elements or sleeves 77. The conveyor buckets 76 comprise a plate-like member 78 having oppositely disposed wing extensions 79 which are suitably apertured for receiving the flexible wire cables 75 so that the ends of the tubular rubber sleeves 77 will abut the opposite surfaces of said wing extensions and be adhesively secured thereto as well as to the flexible wire cables 75 by means of a suitable rubber-to-metal cement composition, such as that previously referred to above. Each of the conveyor buckets 76 is formed by depressing the plate 78 to form bottom, side and end walls 80, 81 and 82 respectively so that when the conveyor element comprising the wire cable 75, sleeve 77 and buckets 76 is being conveyed along a conveyor pathway, the buckets will assume a horizontal position and may be loaded during their vertical travel and dumped or unloaded as they traverse an upper sprocket wheel or member. If desired, the flexible conveyor cables 75 may be disposed in channelways at each side of the conveyor pathway so as to be guided therein with the wing extensions 79 engaging the side walls of the channelway to prevent the rubber spacer sleeve members 77 from frictionally engaging the same. When used in a horizontal position, the endless flexible conveyor cable 75 and tubular rubber sleeve 77 may be disposed in channelways on opposite sides of a conveyor channel pathway so that the conveyor buckets or flights 76 scrape the material from the walls of the conveyor channelway in much the same manner as the drag type conveyor. If desired, the edges of the plate may be provided with rubber wear strips to engage the walls of the conveyor channelway as shown and described in my co-pending application Serial No. 444,312 and now Patent No. 2,400,502 granted May 21, 1946. The cables at each side of the conveyor pathway are adapted to be trained over conveyor sprockets mounted on suitable shafting one at each end thereof.

In the modified form of the invention shown in Figure 13 a pair of flexible wire cables 85 are provided and are adapted to be held in spaced relation by pivoted conveyor buckets 86 extending therebetween in substantially the same manner as shown and described in the form of the invention in Figures 11 and 12. In making up the conveyor structure shown in Figure 13, a series of conveyor bucket supporting members 87 are alternately arranged with a series of tubular rubber spacing sleeves 88 which are slidable endwise on the flexible cable 85 as shown in Figure 13. After the ends of the cables have been connected by suitable coupling elements, the conveyor buckets 86 are pivotally attached to the supporting members 87 and said conveyor buckets are formed of converging bottom walls 89 connected to side and end walls 90 and 91 respectively. A tubular shaft 92 is journaled in bearings 93 carried by the end walls 91 and the ends of said through shaft 92 project a slight distance therebeyond for being received in bearing members 94 carried by and formed integral with the flight supporting members 87. The flexible endless conveyor elements 85 and sleeves 88 are adhesively secured together by a rubber-to-metal cement composition, such as that previously described above, and similarly, the ends of said tubular sleeves 88 are adhesively secured to the conveyor bucket or flight supports 87. In operation, the flexible conveyor elements 85 may be guided in opposed channelways on opposite sides of a conveyor pathway with the flexible endless conveyor element 85 trained over suitable sprockets having teeth adapted to drivingly engage the conveyor flight or bucket supporting members 87.

In the form of the invention shown in Figure 14, a pair of flexible cables 125 are arranged in spaced relation and are adapted to be held in position to form an endless conveyor structure by means of conveyor flight or bucket supports 126. The conveyor flight or conveyor bucket supporting plates are provided with apertures adjacent their ends for permitting the cables to pass therethrough similar to the flight supporting plates 10, 21 and 78 in Figures 1, 4 and 12 respectively. A series of tubular rubber spacing sleeves 127 are alternated with the conveyor flight or conveyor bucket supporting plates and are adapted to be adhesively secured to said plates at the end thereof by a metal-to-rubber adhesive such as has been previously described above. Likewise, the tubular rubber sleeves 127 may be adhesively held in place on the flexible cables 125 by means of applying adhesive of the same composition therebetween.

The free ends of the conveyor flight or conveyor bucket supporting plates 126 are angularly bent as at 128 to provide parallel extensions 129 having suitable apertures 130 for receiving conveyor bucket supporting and anchoring bolts (not shown). Suitable conveyor buckets may be affixed to said parallel extensions so that a conveyor bucket may be provided on opposite sides of the endless flexible conveyor element at each end of the conveyor flight or conveyor bucket supporting plates. The endless conveyor structure described in connection with Figure 14 may be trained over suitable conveyor sprockets so that the teeth of one of the sprockets will drivingly engage the conveyor flight or conveyor bucket supporting plates as they traverse said sprocket. The endless flexible cables 125 and rubber spacing sleeves 127 will be disposed on opposite sides of the radial walls of said conveyor sprockets.

In the modification shown in Figures 15 and 16, a single strand or wire cable 95 forms the endless conveyor element and as in the case of the forms of the invention shown in Figures 1 to 13 inclusive, the cable may comprise either a single strand or a sereis of twisted strands. Slidably mounted on the cable 95 is a series of threaded conveyor flight supporting tubes 96 having internal bores 97 slightly larger in diameter than the cable 95 so as to slide freely thereon. A series of natural or synthetic rubber flight elements 98 are mounted on the tubular threaded sleeve 96, and conveyor flight plates 99 are disposed on opposite sides of the flight 98 which are adapted to be held in place by clamping nuts 100, threaded on the ends of the sleeve 96 as shown clearly in Figure 15. By tightening the nuts 100 the plates 99 may be tightly clamped in place against the natural or synthetic rubber flight element 98 so as to securely hold the same in place on the sleeve 96.

A series of coil springs 101 which are tightly wound and tensioned in a tightly wound condition are received on the flexible wire cable 95 with the ends thereof in abutting relation with the nuts 100 and extending over the ends of the externally threaded sleeve 96. The coil springs 101 may be arranged in abutting relation with the flights and can be employed on any of the conveyor structures shown and described and are flexible enough to permit the lateral bending during their travel over conveyor sprockets.

Surrounding the coil springs 101 is a tubular rubber sleeve 102 which has its ends fitted over the retaining nuts 100 or directly engaging the conveyor flights so that when the externally threaded sleeve 96 is held in a clamped position on the wire cable 95, by the nuts 100, the flights will be held in spaced relation thereon and the rubber sleeve will increase the tensional strength between adjacent flights during the driving thereof. All of the elements are adapted to be secured together by a rubber-to-metal cement composition, with the exception of the spring 101 and rubber sleeve 102. That is, the rubber sleeve 102 may have its ends cemented to the conveyor flight plates 99 and the natural or synthetic rubber flight element 98 may be cemented to the externally threaded sleeve 96. The conveyor structure shown in Figures 15 and 16 is adapted to be driven by a conveyor sprocket similar to that shown in connection with the forms of the invention in Figures 9 and 10, and in the driving of said conveyor elements, the sprocket yoke will receive the flexible wire strand 95 as well as the rubber spacing sleeve 102 so as to exert a force on one side of the conveyor flight which is transmitted to a portion of the remaining flights by means of a compressional force and to the remaining flights by a tensional force. During the drive of the conveyor structure shown in Figures 15 and 16, the compressional force is exerted upon adjacent flights by the coil spring 101 and the tensional force is transmitted to the remaining flights through the coupling sleeves and wire cable 95. The use of the coil spring is also applicable to the forms of the invention using double cables.

In the modified form of the invention shown in Figures 17 and 18, a flexible cable 105 forms the endless conveyor element, and slidably received thereon is a series of externally threaded tubular sleeves 106 for receiving the natural or synthetic rubber flight elements 107. The flight elements 107 are of disc-like formation similar to those shown in Figures 15 and 16 and are adapted to be held in place by conveyor flight clamping plates 108 and 109 having apertures at the center thereof for being received on the tubular sleeve 106 on opposite sides of the conveyor flights 107. Clamping nuts 110 are threaded on the end of the externally threaded tubular sleeve 106 so as to securely clamp said conveyor flight plates 108 and 109 in position. Compressional coil springs 111 are mounted on the endless cable 105 with ends thereof received on the ends of the tubular externally threaded sleeve 106 and arranged in abutting relation with the clamping nuts 110. Tubular rubber spacing sleeves 112 encircle the compressional coil springs 111 and have their ends fitted over the clamping nuts 110 in substantially the same manner as shown and described in connection with the form of the invention shown in Figures 15 and 16.

The conveyor flight clamping plate 109 is provided at its peripheral edge with a flange 113 which is adapted to form a cup-shaped flight member to facilitate the cleaning of the conveyor conduit or casing as the conveyor is operated in the absence of a load. In this manner, the tubular conveyor passageway may be completely emptied after all the material has been conveyed by running the conveyor a short length of time when the contents of the charging hopper has been completely charged to the conveyor and thereby emptied. It is intended that the rubber spacing sleeve 112 be secured to the clamping nuts 110 and conveyor flight plates 108 and 109 by means of a rubber-to-metal adhesive, such as that previously referred to above, to provide a bond therebetween and thereby increase the tensile strength of the conveyor cable 105 as well as housing the coil springs 111.

In the modified form of the invention shown in Figure 19, a flexible conveyor cable 115 is provided with a series of externally threaded tubular clamping sleeves 116 which are slotted at circumferentially spaced distances at the ends as at 117 so as to clampingly engage the cable 115 when clamping nuts 118 are threaded on the ends of the sleeve 116. A natural or synthetic rubber flight element 119 of disc-like form is received on the externally threaded clamping sleeve 116 and clamping plates 120 are disposed on opposite sides of the natural or synthetic rubber flight element 119 adapted to be held in place by nuts 121 so as to clamp said clamping plates 120 into clamping engagement with the natural or synthetic rubber flight element 119.

In the form of the invention shown in Figure 19, the ends of the cable 115 may be connected by inserting one end in one end of the externally threaded clamping sleeve 116 and the opposite end of the cable in the other end thereof so that the clamping nuts 118 may be tightened in place to cause the yielding end portions of the sleeve to engage and grip the ends of the cable and thereby couple the same to form an endless single strand conveyor element. The coupling and retaining sleeve 116 may be employed in all of the conveyor structures shown and described and may be used as the sole means for holding the flights on the flexible cable.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A conveyor structure, comprising a flexible conveyor element, a series of conveyor flight supporting plates mounted on said conveyor element, flexible rubber flights disposed between adjacent pairs of said supporting plates, a series of rubber sleeve members extending between said flight supporting plates, a series of tightly wound coil springs interposed between adjacent flight members having their ends arranged in abutting relationship with adjacent flight supporting plates, and an adhesive composition for uniting the conveyor flight supporting plates and conveyor flights to said flexible conveyor element.

2. A conveyor structure, comprising a flexible conveyor element, a series of conveyor flight supporting plates mounted on said conveyor element, flexible rubber flights disposed between adjacent pairs of said supporting plates, a series of tightly wound coil springs interposed between adjacent flights having their ends arranged in abutting relationship with adjacent flight supporting plates, and an adhesive composition for uniting the conveyor flight supporting plates and conveyor flights to said flexible conveyor element.

3. A conveyor structure, comprising a flexible conveyor element, a series of externally threaded sleeve members arranged on said flexible conveyor element, rubber conveyor flights received on said sleeve members, conveyor flight supporting plates disposed on opposite sides of said conveyor flights, retaining nuts on said sleeve member for clamping said plates in contactual engagement with said conveyor flights, coil springs extending between adjacent conveyor flights with their ends received on said sleeve members, and flexible rubber sleeve members encircling said coil springs with their ends received on said retaining nuts.

4. A conveyor structure, comprising a flexible conveyor cable, a series of externally threaded sleeve members arranged on said flexible conveyor cable, rubber conveyor flights received on said sleeve members, conveyor flight supporting plates disposed on opposite sides of said conveyor flights, retaining nuts on said sleeve member for clamping said plates in contactual engagement with said conveyor flights, coil springs encircling said cable and extending between adjacent conveyor flights with their ends received on said sleeve members, and flexible rubber sleeve members encircling said coil springs with their ends received on said retaining nuts.

5. A conveyor structure, comprising a flexible conveyor element, a series of conveyor flight supporting plates spacedly mounted on said conveyor element, flexible flights of rubber-like material secured to said supporting plates, a series of sleeve members of rubber-like material extending between said flight supporting plates, and a series of coil springs interposed between adjacent flights having their ends arranged in abutting relationship with adjacent flight supporting plates.

6. A conveyor structure, comprising a flexible conveyor element, a series of conveyor flight supporting plates spacedly mounted on said conveyor element, flexible flights of rubber-like material secured to said supporting plates, and a series of coil springs interposed between adjacent flights having their ends arranged in abutting relationship with adjacent flight-supporting plates.

7. A conveyor structure, comprising a flexible conveyor element, a series of conveyor flights spacedly mounted on said conveyor element, and a series of coil springs mounted on and encircling said flexible conveyor element, said coil springs being interposed between adjacent flights and having their ends arranged in abutting relationship with said adjacent flights.

HENRY W. HAPMAN.

REFERENCES CITED

The following references are of record in the file of this patent:

UNITED STATES PATENTS

| Number | Name | Date |
| --- | --- | --- |
| 1,269,013 | Smiley | June 11, 1918 |
| 1,953,245 | Mackenzie | Apr. 3, 1934 |
| 1,956,312 | Browning | Apr. 24, 1934 |
| 1,970,250 | Redler | Aug. 14, 1934 |
| 2,147,199 | Hapman | Feb. 14, 1939 |
| 2,204,236 | Shonnard | June 11, 1940 |
| 2,276,978 | Hyman et al. | Mar. 17, 1942 |
| 2,326,535 | Hapman | Aug. 10, 1943 |